US011709609B2

(12) United States Patent
Tsai et al.

(10) Patent No.: US 11,709,609 B2
(45) Date of Patent: Jul. 25, 2023

(54) DATA STORAGE SYSTEM AND GLOBAL DEDUPLICATION METHOD THEREOF

(71) Applicant: VIA Technologies, Inc., New Taipei (TW)

(72) Inventors: Chin-Yin Tsai, New Taipei (TW); Yi-Lin Lai, New Taipei (TW)

(73) Assignee: VIA Technologies, Inc., New Taipei (TW)

( * ) Notice: Subject to any disclaimer, the term of this patent is extended or adjusted under 35 U.S.C. 154(b) by 0 days.

(21) Appl. No.: 17/195,551

(22) Filed: Mar. 8, 2021

(65) Prior Publication Data

US 2021/0303193 A1 Sep. 30, 2021

Related U.S. Application Data

(60) Provisional application No. 63/000,508, filed on Mar. 27, 2020.

(30) Foreign Application Priority Data

Feb. 19, 2021 (TW) .................................. 110105608

(51) Int. Cl.
*G06F 3/06* (2006.01)
*H04L 67/1097* (2022.01)

(52) U.S. Cl.
CPC .......... *G06F 3/0641* (2013.01); *G06F 3/0608* (2013.01); *G06F 3/0619* (2013.01); *G06F 3/0689* (2013.01); *H04L 67/1097* (2013.01)

(58) Field of Classification Search
CPC . H04L 67/1097; G06F 3/0619; G06F 3/0608; G06F 3/0641
See application file for complete search history.

(56) References Cited

U.S. PATENT DOCUMENTS 8,898,120 B1 * 11/2014 Efstathopoulos ... G06F 16/1752
707/698
2016/0349993 A1 * 12/2016 Udupi ..................... G06F 3/067
(Continued)

FOREIGN PATENT DOCUMENTS

| TW | 201308115 | 2/2013 |
| TW | 201423425 | 6/2014 |
| TW | 201908987 | 3/2019 |

OTHER PUBLICATIONS

"Office Action of Taiwan Counterpart Application", dated Apr. 11, 2022, p. 1-p. 9.

*Primary Examiner* — Edward J Dudek, Jr.
(74) *Attorney, Agent, or Firm* — JCIPRNET

(57) ABSTRACT

A data storage system and a global deduplication method thereof are provided. The data storage system includes multiple storage devices and one dispatch device. The dispatch device divides an original data corresponding to a data writing request into at least one data chunk. The dispatch device performs a summary calculation on one data chunk, so as to generate a representative value. The dispatch device performs a first distribution calculation on the representative value, so as to determine a destination location corresponding to the representative value. The dispatch device transmits the data chunk and the representative value to at least one destination storage device among the storage devices through a communication network according to the destination location. The at least one destination storage device checks the representative value, so as to determine whether to store the data chunk in a storage space of the at least one destination storage device.

24 Claims, 13 Drawing Sheets

(56) References Cited

U.S. PATENT DOCUMENTS

| | | | |
|---|---|---|---|
| 2018/0143780 A1* | 5/2018 | Cho | G06F 3/0608 |
| 2018/0307701 A1* | 10/2018 | Shanmuganathan | G06F 16/1752 |
| 2020/0034339 A1* | 1/2020 | Gershaneck | G06F 16/125 |

* cited by examiner

DATA STORAGE SYSTEM AND GLOBAL DEDUPLICATION METHOD THEREOF

CROSS-REFERENCE TO RELEVANT APPLICATION

This application claims the priority benefit of U.S. provisional application Ser. No. 63/000,508, filed on Mar. 27, 2020, and Taiwan application serial no. 110105608, filed on Feb. 19, 2021. The entirety of the above-mentioned patent applications are hereby incorporated by reference herein and made a part of this specification.

BACKGROUND

Technical Field

This disclosure relates to a data storage technology, and in particular to a data storage system and a global deduplication method thereof.

Description of Related Art

A distributed storage system (data storage system) includes multiple object storage devices. The object storage devices may be connected to each other via a communication network. The communication network includes a local area network and/or the Internet. Multiple user devices may store data in the distributed storage system through the network. In any case, the data stored in the distributed storage system may be duplicated. In order to more effectively store a large amount of data in the distributed storage system, a data reduction technology, such as deduplication, is required. A deduplication technology may eliminate duplicates of the duplicated data, so as to reduce the amount of the stored data.

An example of the distributed storage system is Ceph. Ceph is a well-known open-source software storage platform, which implements storage of objects in a single distributed computer cluster. It is difficult for the distributed storage system to perform global deduplication due to the data processing process and additional metadata management of the distributed storage system. For example, Ceph does not support global deduplication.

It should be noted that the content in the "related art" paragraphs is to facilitate understanding of the disclosure. Part of the content (or all of the content) disclosed in the "related art" paragraphs may not be the conventional technology known to those with ordinary skill in the art. The content disclosed in the "related art" paragraphs does not represent that the content has been known to those with ordinary skill in the art before the application of this disclosure.

SUMMARY

This disclosure provides a data storage system and a global deduplication method thereof, which can effectively deduplicate in a distributed storage environment.

In an embodiment of the disclosure, the data storage system includes multiple storage devices and one dispatch device. The storage devices are suitable for coupling to a communication network. The dispatch device is suitable for receiving a data writing request. The dispatch device is configured to divide an original data corresponding to the data writing request into at least one data chunk. The dispatch device performs a summary calculation on a current data chunk in the at least one data chunk, so as to generate a representative value corresponding to the current data chunk. The dispatch device performs a first distribution calculation on the representative value, so as to determine a destination location corresponding to the representative value. The dispatch device transmits the current data chunk and the representative value to at least one destination storage device among the storage devices through the communication network according to the destination location. The at least one destination storage device checks the representative value, so as to determine whether to store the current data chunk in a storage space of the at least one destination storage device.

In an embodiment of the disclosure, the global deduplication method includes the following steps. A data writing request is received by a dispatch device. An original data corresponding to the data writing request is divided into at least one data chunk by the dispatch device. A summary calculation is performed on a current data chunk in the at least one data chunk by the dispatch device, so as to generate a representative value corresponding to the current data chunk. A first distribution calculation is performed on the representative value by the dispatch device, so as to determine a destination location corresponding to the representative value. The current data chunk and the representative value are transmitted by the dispatch device to at least one destination storage device among the multiple storage devices through a communication network according to the destination location. And the representative value is checked by the at least one destination storage device, so as to determine whether to store the current data chunk in a storage space of the at least one destination storage device.

Based on the above, the data storage system and the global deduplication method thereof according to the embodiments of the disclosure may be applied to a distributed storage system. The dispatch device may generate the representative value corresponding to the current data chunk, and determine the destination location according to the representative value. The dispatch device may transmit the current data chunk and the representative value to the at least one destination storage device among the multiple storage devices through a communication network (such as a local area network or other network) according to the destination location. In other words, the same data chunk is transferred to the same storage device. The destination storage device may check the representative value, so as to determine whether to store the current data chunk in its local storage space. Therefore, the data storage system can effectively deduplicate in the distributed storage environment.

To make the abovementioned more comprehensible, several embodiments accompanied by drawings are described in detail as follows.

DESCRIPTION OF THE EMBODIMENTS

Figure 1:
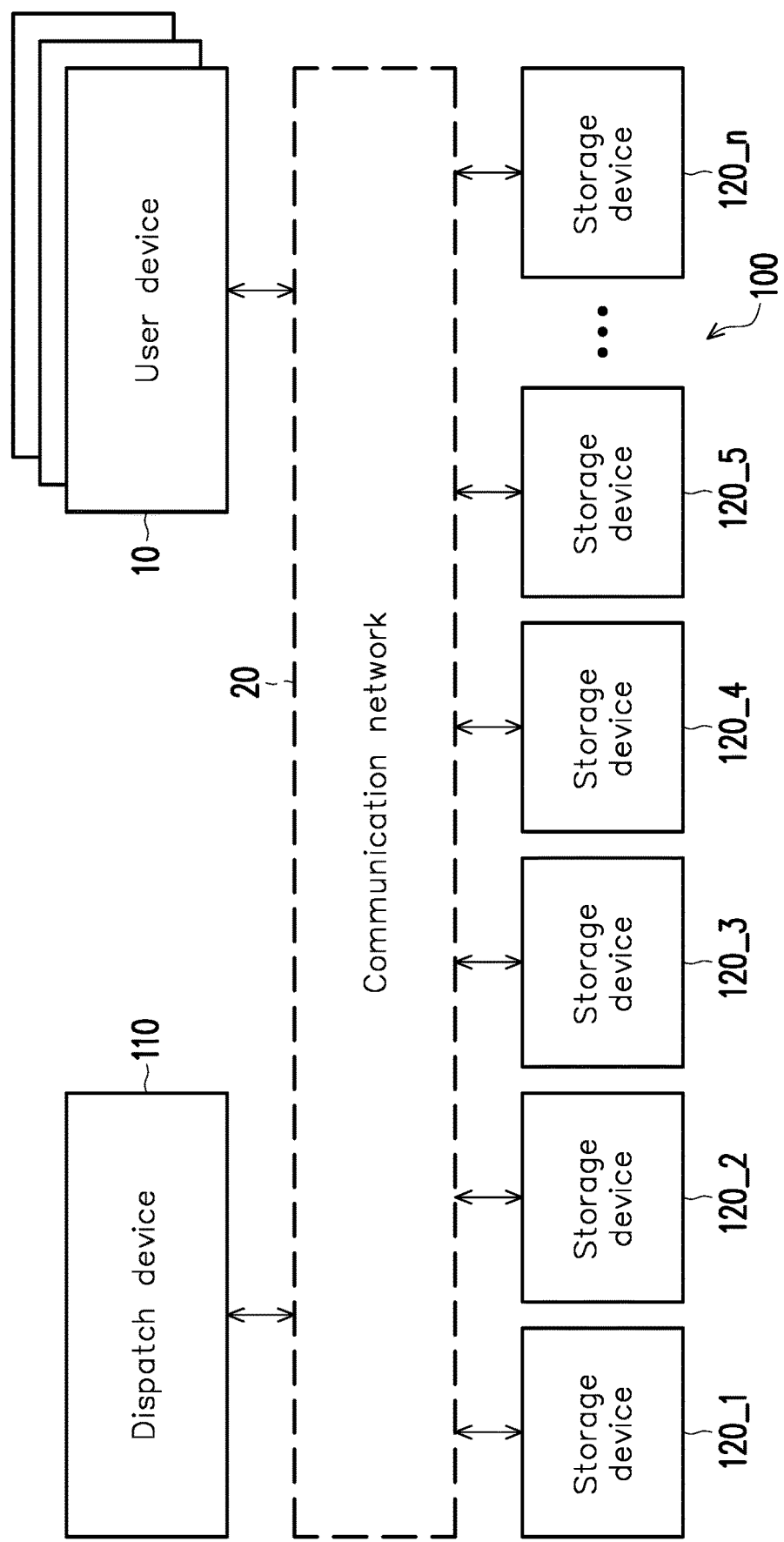
FIG. 1 is a schematic diagram of a circuit block of a data storage system according to an embodiment of the disclosure.

The term "coupled to (or connected to)" used in the full text of the specification of this disclosure (including the scope of the patent application) may refer to any direct or indirect connection means. For example, if the text describes that the first device is coupled (or connected) to the second device, it should be interpreted as that the first device may be directly connected to the second device, or the first device may be indirectly connected to the second device through other devices or some forms of connection means. Terms such as "first" and "second" mentioned in the full text of the specification of this disclosure (including the scope of the patent application) are used for naming an element, or to distinguish between the different embodiments or ranges, and are not used to limit an upper limit or an lower limit of the number of the element, and are not used to limit a sequence of the element. In addition, wherever possible, elements/components/steps with the same reference numerals in the drawings and the embodiments represent the same or similar parts. Reference may be made to the relevant descriptions of the elements/components/steps using the same reference numerals or using the same terminology in the different embodiments.

FIG. 1 is a schematic diagram of a circuit block of a data storage system 100 according to an embodiment of the disclosure. A user device 10 may send a data writing request, a data reading request, and/or other requests to the data storage system 100 through a communication network 20. The data storage system 100 may provide cloud storage service to one or more of the user device 10 through the communication network 20. The user device 10 may be a mobile phone, a tablet computer, a notebook computer, a personal computer, and/or other electronic apparatuses. The communication network 20 may include a local area network, the Internet, and/or other communication networks.

In the embodiment shown in FIG. 1, the data storage system 100 includes a dispatch device 110, a storage device 120_1, a storage device 120_2, a storage device 120_3, a storage device 120_4, a storage device 120_5, ..., a storage device 120_n. The dispatch device 110 and the storage devices 120_1 to 120_n are suitable for coupling to the communication network 20. The number n of the storage devices 120_1 to 120_n may be determined according to design requirements. For example, in an embodiment, the number n may be 2.

The storage devices 120_1 to 120_n may be multiple electronic apparatuses independent of each other. Any of the storage devices 120_1 to 120_n may be a personal computer, a workstation, a server, a network attached storage (NAS) device, and/or other electronic apparatuses, according to the design requirements. In some embodiments, the dispatch device 110 may be another electronic apparatus independent of the storage devices 120_1 to 120_n, and the dispatch device 110 may be a personal computer, a workstation, a server, a NAS device, and/or other electronic apparatuses, according to the design requirements. In other embodiments, at least one of the storage devices 120_1 to 120_n may be selected as the dispatch device 110.

Blocks of the dispatch device 110 and/or the storage devices 120_1 to 120_n may be implemented as hardware, firmware, software (that is, a program), or a combination of at least two of the three, according to the design requirements. In terms of hardware, relevant functions of the blocks of the dispatch device 110 and/or the storage devices 120_1 to 120_n may be implemented in one or more controllers, a microcontroller, a microprocessor, an application-specific integrated circuit (ASIC), a digital signal processor (DSP), a field programmable gate array (FPGA), and/or various logic blocks, modules, and circuits in other processing units.

In terms of software and/or firmware, the relevant functions of the dispatch device 110 and/or the storage devices 120_1 to 120_n may be implemented as a programming code. For example, a general programming language (such as C, C++, or other assembly languages) or other suitable programming language is used to implement the dispatch device 110 and/or the storage devices 120_1 to 120_n. The programming code may be recorded/stored in a recording medium. In some embodiments, the recording medium includes, for example, a read-only memory (ROM), a storage device, and/or a random access memory (RAM). In other embodiments, the recording medium may include "non-transitory computer readable medium". For example, a tape, a disk, a card, a semiconductor memory, a programmable logic circuit, etc., may be used to implement the non-transitory computer readable medium. A computer, a central processing unit (CPU), a controller, a microcontroller, or a microprocessor may read and execute the programming code from the recording medium, thereby implementing the relevant functions of the dispatch device 110 and/or the storage devices 120_1 to 120_n. Moreover, the programming code may also be provided to the computer (or the CPU) via any transmission medium (such as a communication network or broadcasting waves). The communication network is, for example, the Internet, wired communication, wireless communication, or other communication media.

Figure 2:
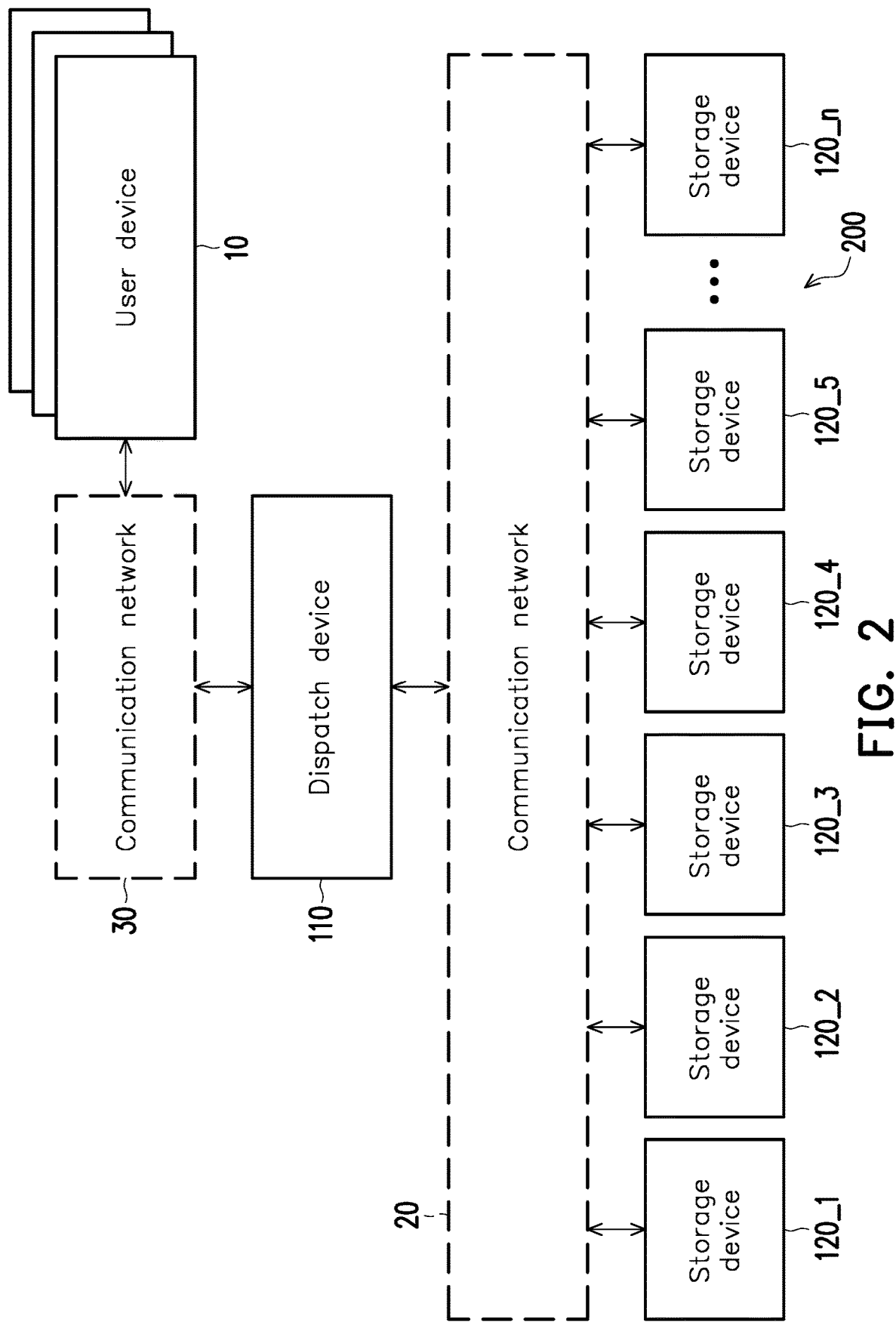
FIG. 2 is a schematic diagram of a circuit block of a data storage system according to another embodiment of the disclosure.

FIG. 2 is a schematic diagram of a circuit block of a data storage system 200 according to another embodiment of the disclosure. The user device 10 may send the data writing request, the data reading request, and/or other requests to the data storage system 200 through a communication network 30. The data storage system 200 may provide cloud storage service to the one or more user device 10 through the communication network 30. The communication network 30 may include a local area network, the Internet, and/or other communication networks. Reference may be made to the relevant description of the user device 10 shown in FIG. 1 for the user device 10 shown in FIG. 2, which will not be repeated here.

In the embodiment shown in FIG. 2, the data storage system 200 includes the dispatch device 110 and the storage devices 120_1 to 120_n. The dispatch device 110 and the storage devices 120_1 to 120_n are suitable for coupling to the communication network 20. Reference may be made to the relevant descriptions of the communication network 20, the dispatch device 110, and the storage devices 120_1 to 120_n shown in FIG. 1 for the communication network 20, the dispatch device 110, and the storage devices 120_1 to 120_n shown in FIG. 2, which will not be repeated here.

Figure 3:
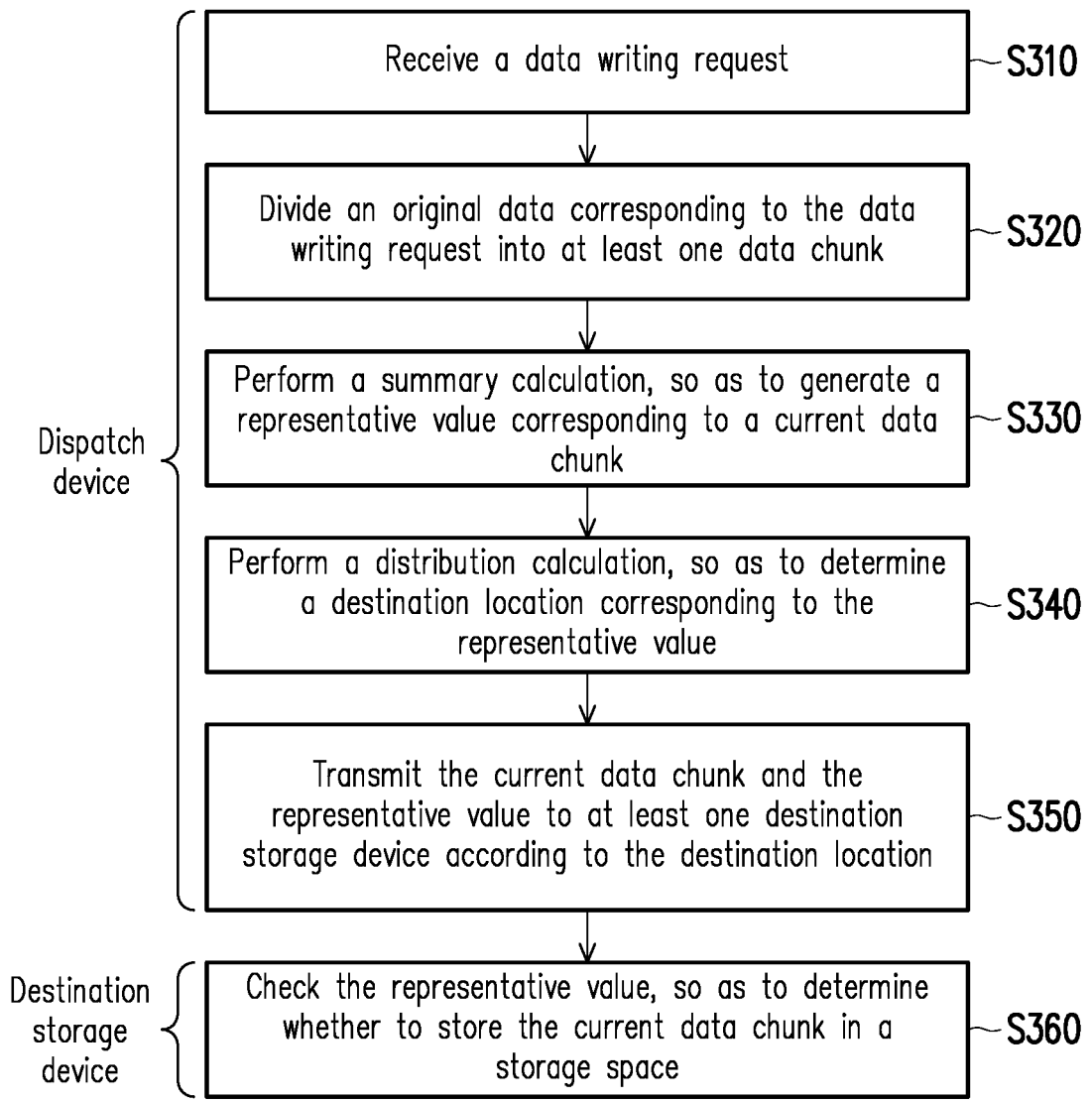
FIG. 3 is a schematic flowchart of a global deduplication method according to an embodiment of the disclosure.

FIG. 3 is a schematic flowchart of a global deduplication method according to an embodiment of the disclosure. The global deduplication method shown in FIG. 3 may be applied to the data storage system 100 shown in FIG. 1 and/or the data storage system 200 shown in FIG. 2. One may refer to FIGS. 1 and 3 to understand the following description, or refer to FIGS. 2 and 3 to understand the following description, according to the design requirements.

In Step S310, the dispatch device 110 may receive a data writing request from the user device 10. The data writing request may include an original key value OID and an original data D. That is, the user device 10 requests to write the original data D into the data storage system.

In Step S320, the dispatch device 110 may divide the original data D corresponding to the data writing request into one (or more) data chunks. In Step S330, the dispatch device 110 may perform a summary calculation on a current data chunk in the data chunks, so as to generate a representative value corresponding to the current data chunk. In some embodiments, the summary calculation may include a hash algorithm and/or other algorithms, and the representative value may include a hash value of the current data chunk, according to the design requirements. For example, the dispatch device 110 may divide the original data D into a data chunk ChunkA and a data chunk ChunkB. The dispatch device 110 may perform a hash calculation on the data chunk ChunkA, so as to generate a representative value HIDa. And, the dispatch device 110 may perform the hash calculation on the data chunk ChunkB, so as to generate a representative value HIDb. The dispatch device 110 may record a mapping relationship between the original key value OID, the representative value HIDa, and the representative value HIDb in a lookup table of the dispatch device 110.

In Step S340, the dispatch device 110 may perform a distribution calculation on the representative value, so as to determine a destination location corresponding to the representative value. In Step S350, the dispatch device 110 may transmit the current data chunk and the representative value to at least one destination storage device among the storage devices 120_1 to 120_n through the communication network 20 according to the destination location. In some embodiments, the distribution calculation may include Ceph CRUSH algorithm and/or other algorithms, according to the design requirements. The Ceph CRUSH algorithm is a conventional technology, which will not be repeated here. For example, the dispatch device 110 may perform a CRUSH calculation on the representative value HIDa of the data chunk ChunkA and transmit the data chunk ChunkA to the storage device 120_1 (destination storage device) according to the calculated result (hypothesis). Similarly, the dispatch device 110 may perform the CRUSH calculation on the representative value HIDb of the data chunk ChunkB and transmit the data chunk ChunkB to the storage device 120_4 (destination storage device) according to the calculated result (hypothesis).

In Step S360, the destination storage device may check the representative value, so as to determine whether to store the current data chunk in a storage space of the destination storage device. The storage space may be a hard disk (HDD), a solid state drive (SSD), and/or other storage media of the destination storage device, according to the design requirements. For example, the storage device 120_1 (destination storage device) may check the representative value HIDa, so as to determine whether to store the data chunk ChunkA in a storage space of the storage device 120_1, after the data chunk ChunkA and the representative value HIDa are transmitted to the storage device 120_1 by the dispatch device 110. Similarly, the storage device 120_4 (destination storage device) may check the representative value HIDb, so as to determine whether to store the data chunk ChunkB in a storage space of the storage device 120_1, after the data chunk ChunkB and the representative value HIDb are transmitted to the storage device 120_4 by the dispatch device 110.

Figure 4:
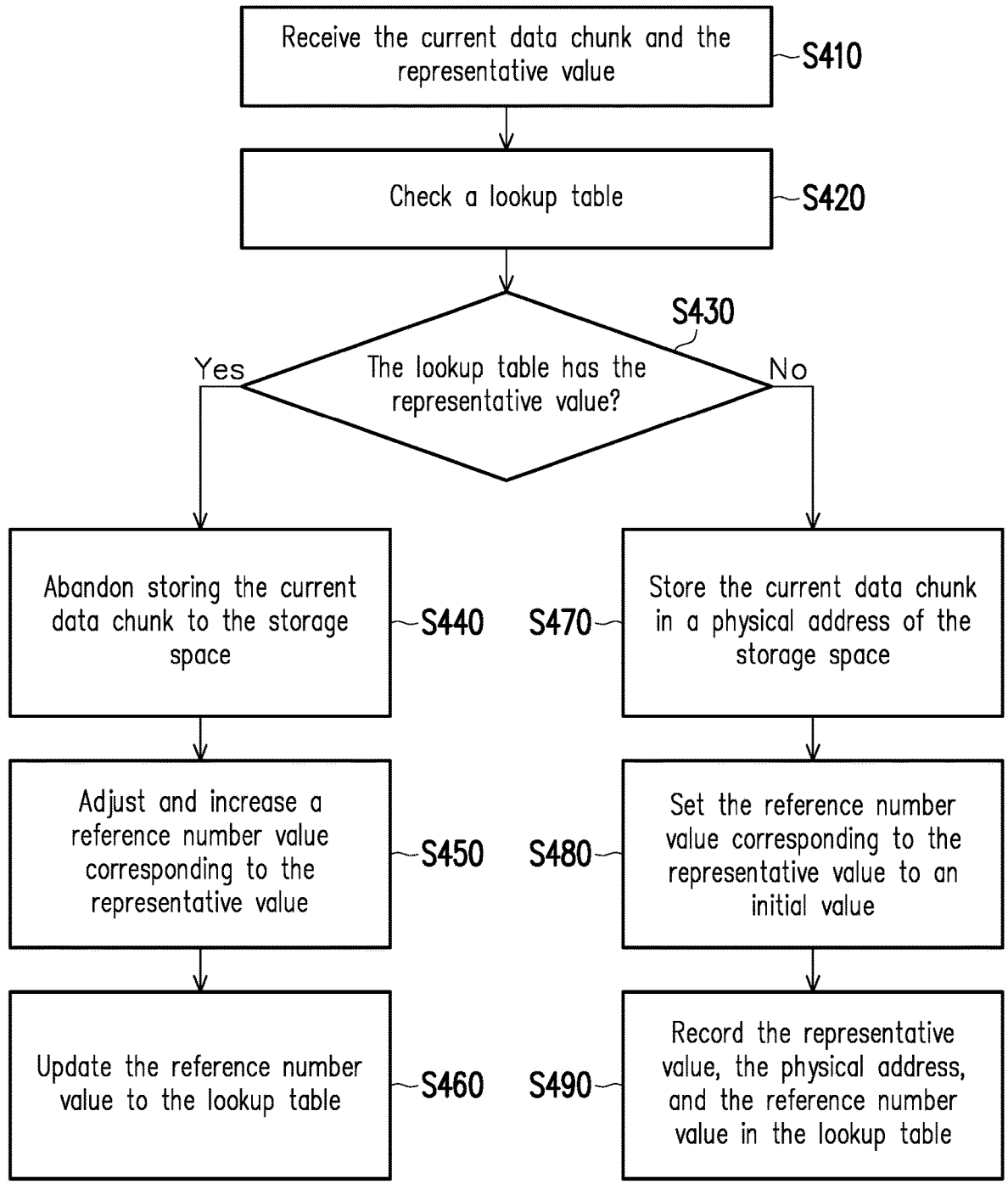
FIG. 4 is a schematic diagram of an operation flow of a storage device according to an embodiment of the disclosure.

FIG. 4 is a schematic diagram of an operation flow of a storage device according to an embodiment of the disclosure. Reference may be made to relevant description of FIG. 4 for the Step S360 shown in FIG. 3. In the embodiment shown in FIG. 4, each of the storage devices 120_1 to 120_n has a lookup table (or a linked table). In Step S410, the destination storage device may receive the current data chunk and the representative value provided by the dispatch device 110. In Step S420, the destination storage device may check whether the representative value exists in the lookup table. For example, the storage device 120_1 (destination storage device) may check whether the representative value HIDa exists in the lookup table of the storage device 120_1 after the data chunk ChunkA and the representative value HIDa are transmitted to the storage device 120_1 by the dispatch device 110.

The destination storage device may perform Steps S440, S450, and S460 when the lookup table has the representative value (that is, judgment result of Step S430 is "Yes"). In Step S440, the destination storage device will abandon storing the current data chunk provided by the dispatch device 110 to the storage space. That is, discarding of the current data chunk provided by the dispatch device 110. In Step S450, the destination storage device may adjust and increase a reference number value corresponding to the representative value. In Step S460, the destination storage device may update the reference number value to the lookup table. For example, the storage device 120_1 (destination storage device) may discard the current data chunk ChunkA provided by the dispatch device 110, incrementally accumulate a reference number value RefCnt corresponding to the representative value HIDa by 1, and update the reference number value RefCnt to the look-up table of the storage device 120_1 when the lookup table of the storage device 120_1 has the representative value HIDa.

The destination storage device may perform Steps S470, S480, and S490 when the lookup table does not have the representative value (that is, the judgment result of the Step S430 is "No"). In Step S470, the destination storage device may store the current data chunk provided by the dispatch device 110 in a physical address of the storage space. In Step S480, the destination storage device may set the reference number value corresponding to the representative value to an initial value (for example, 0). In Step S490, the destination storage device may record the representative value, the physical address, and the reference number value in the lookup table. For example, assuming that a length of the current data chunk ChunkA is L, the storage device 120_1 (destination storage device) may store the current data chunk ChunkA provided by the dispatch device 110 in a certain physical address FADD of the storage space of the storage device 120_1, reset the reference number value RefCnt corresponding to the representative value HIDa to 0, and record the representative value HIDa, the physical address FADD, the length L, and the reference number value RefCnt in the lookup table of the storage device 120_1 when the lookup table of storage device 120_1 does not have the representative value HIDa.

Figure 5:
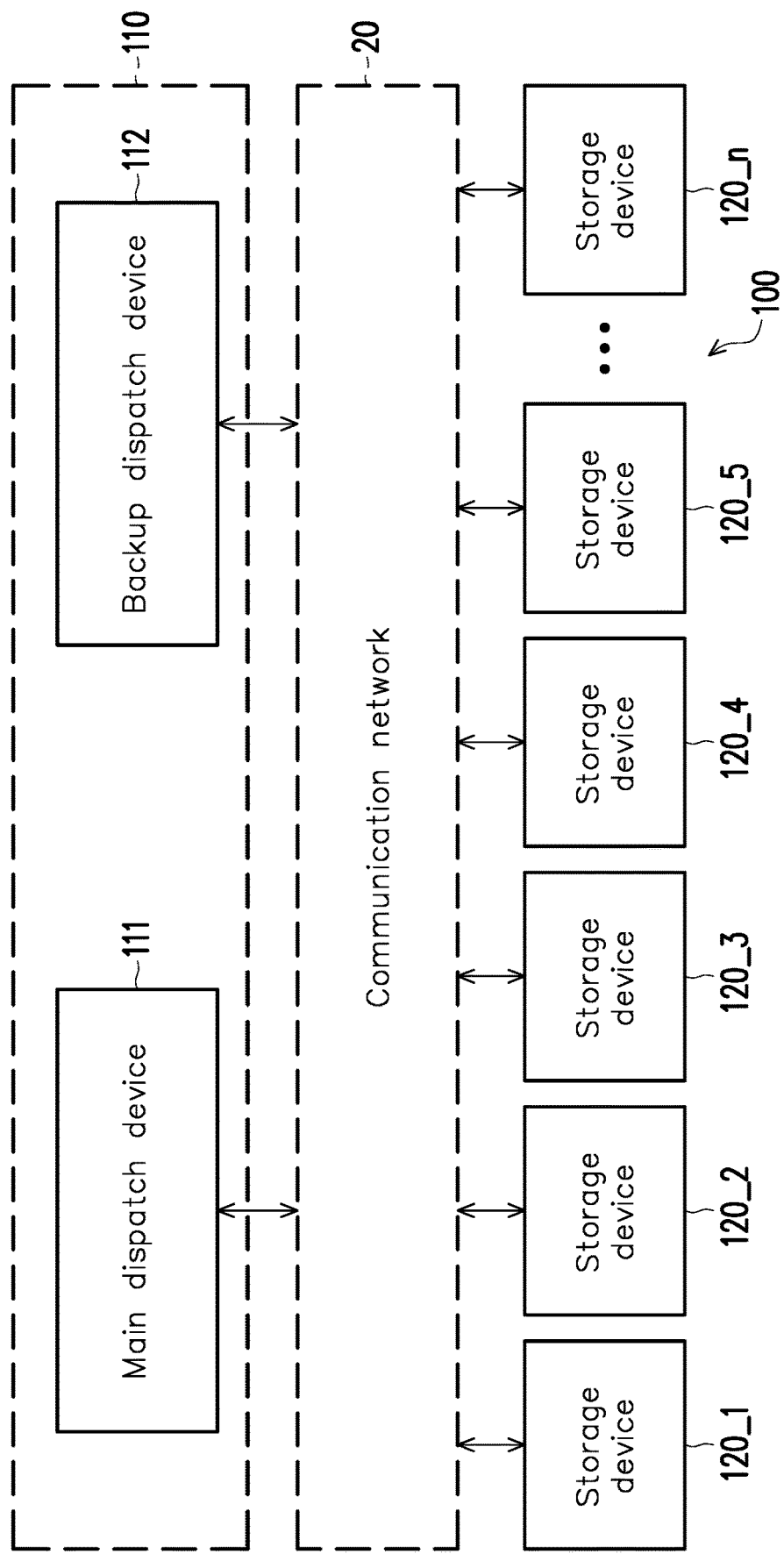
FIG. 5 is a schematic diagram illustrating a circuit block of the dispatch device shown in FIG. 1 or 2 according to an embodiment of the disclosure.

FIG. 5 is a schematic diagram illustrating a circuit block of the dispatch device 110 shown in FIG. 1 or 2 according to an embodiment of the disclosure. Reference may be made to the relevant descriptions of FIG. 3 and/or FIG. 4 for the embodiment described in FIG. 5, according to the design requirements. In the embodiment shown in FIG. 5, the dispatch device 110 includes a main dispatch device 111 and a backup dispatch device 112. The main dispatch device 111 and the backup dispatch device 112 are suitable for coupling to the communication network 20. The main dispatch device 111 and the backup dispatch device 112 are two independent electronic apparatuses. Either the main dispatch device 111 or the backup dispatch device 112 may be a personal computer, a workstation, a server, a NAS device, and/or other electronic apparatuses, according to the design requirements. In some embodiments, the main dispatch device 111 (or the backup dispatch device 112) may be another electronic apparatus independent of the storage devices 120_1 to 120_n, according to the design requirements. In other embodiments, at least one of the storage devices 120_1 to 120_n may be selected to serve as the main dispatch device 111 (or the backup dispatch device 112).

Blocks of the main dispatch device 111 and/or the backup dispatch device 112 may be implemented as hardware, firmware, software (that is, a program), or a combination of at least two of the three, according to different design requirements. In terms of software and/or firmware, relevant functions of the main dispatch device 111 and/or the backup dispatch device 112 may be implemented as a programming code. For example, a general programming language (such as C, C++, or other assembly languages) or other suitable programming language is used to implement the main dispatch device 111 and/or backup dispatch device 112. The programming code may be recorded/stored in a recording medium. A computer, a CPU, a controller, a microcontroller, or a microprocessor may read and execute the programming code from the recording medium, thereby implementing the relevant functions of the main dispatch device 111 and/or the backup dispatch device 112. Moreover, the programming code may also be provided to the computer (or the CPU) via any transmission medium (such as a communication network or broadcasting waves).

Figure 6:
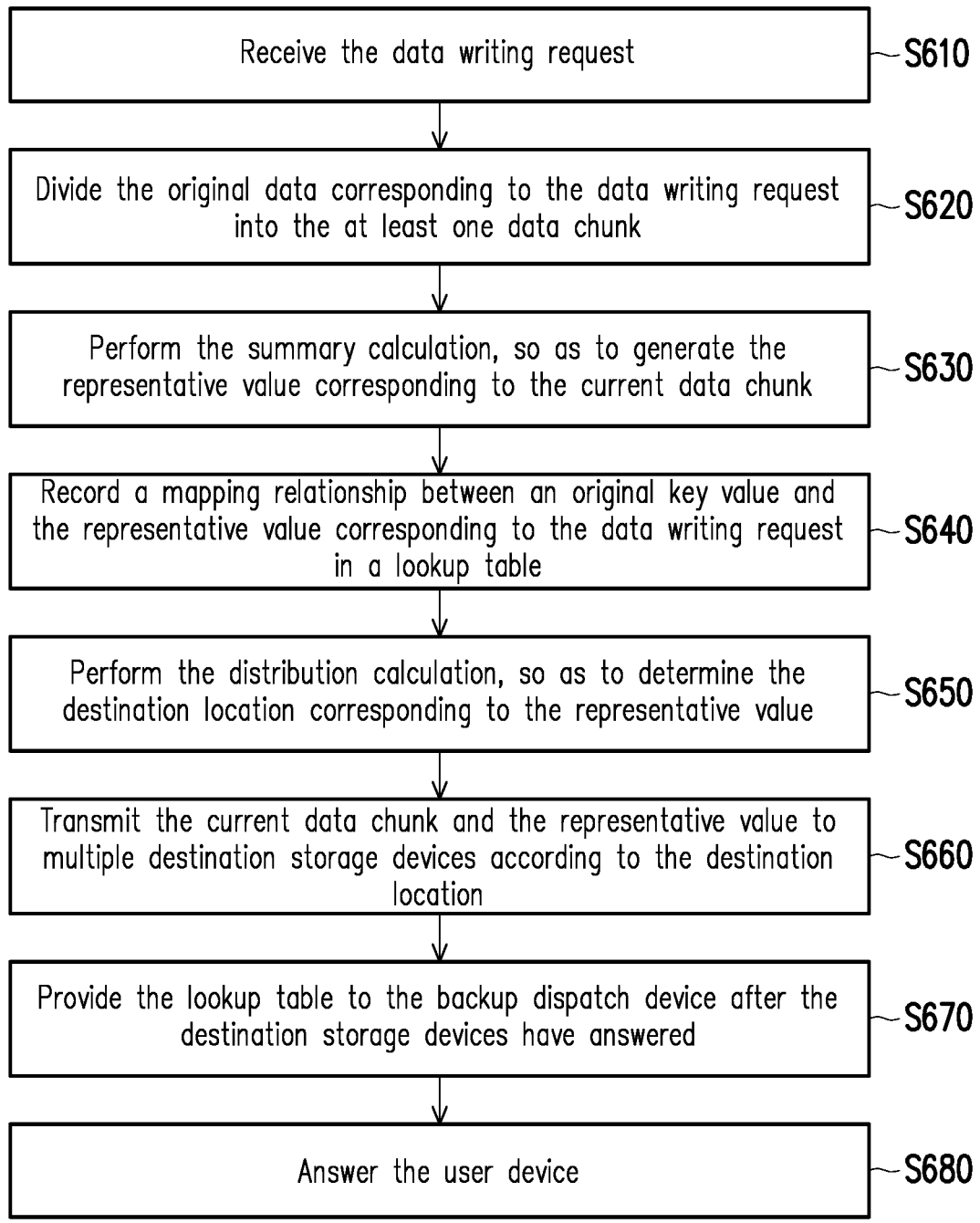
FIG. 6 is a schematic diagram illustrating a writing operation flow of the main dispatch device shown in FIG. 5 according to an embodiment of the disclosure.

FIG. 6 is a schematic diagram illustrating a writing operation flow of the main dispatch device 111 shown in FIG. 5 according to an embodiment of the disclosure. The function of the backup dispatch device 112 shown in FIG. 5 may be deduced by analogy with reference to the relevant description of the main dispatch device 111. With reference to FIGS. 5 and 6, in Step S610, the main dispatch device 111 may receive a data writing request from the user device 10. The data writing request may include the original key value OID and the original data D.

In Step S620, the main dispatch device 111 may divide the original data D corresponding to the data writing request into one (or more) data chunks. In Step S630, the main dispatch device 111 may perform a summary calculation on a current data chunk in the data chunks, so as to generate a representative value corresponding to the current data chunk. In Step S640, the main dispatch device 111 may record a mapping relationship between the original key value and the representative value in a lookup table of the main dispatch device 111. For example, the main dispatch device 111 may divide the original data D into the data chunk ChunkA and the data chunk ChunkB. The main dispatch device 111 may perform a hash calculation on the data chunk ChunkA, so as to generate the representative value HIDa. And, the main dispatch device 111 may perform the hash calculation on the data chunk ChunkB, so as to generate the representative value HIDb. The main dispatch device 111 may record the mapping relationship between the original key value OID, the representative value HIDa, and the representative value HIDb in the lookup table of the main dispatch device 111.

In Step S650, the main dispatch device 111 may perform a distribution calculation on the representative value, so as to determine a destination location corresponding to the representative value. In Step S660, the main dispatch device 111 may transmit the current data chunk and the representative value to multiple destination storage devices among the storage devices 120_1 to 120_n through the communication network 20 according to the destination location. For example, the main dispatch device 111 may perform a CRUSH calculation on the representative value HIDa of the data chunk ChunkA, and transmit the representative value HIDa and the data chunk ChunkA to the storage devices 120_1 and 120_2 (destination storage devices) according to the calculated result (hypothesis). The same data chunk ChunkA is transmitted to the storage devices 120_1 and 120_2 to implement a replication function. Similarly, the main dispatch device 111 may perform the CRUSH calculation on the representative value HIDb of the data chunk ChunkB, and transmit the representative value HIDb and the data chunk ChunkB to the storage devices 120_4 and 120_5 (destination storage devices) according to the calculated result (hypothesis).

The main dispatch device 111 may provide the lookup table to the backup dispatch device 112 (Step S670) after the destination storage devices have answered (indicating successful storage). In Step S680, the main dispatch device 111 may answer the user device 10, so as to indicate successful storage. The content of the lookup table of the backup dispatch device 112 is consistent with the content of the lookup table of the main dispatch device 111. Therefore, the backup dispatch device 112 may replace the main dispatch device 111 to perform the writing operation flow shown in FIG. 6 and/or a reading operation flow shown in FIG. 7 when the lookup table of the main dispatch device 111 is damaged, or when the main dispatch device 111 is unable to operate normally.

Figure 7:
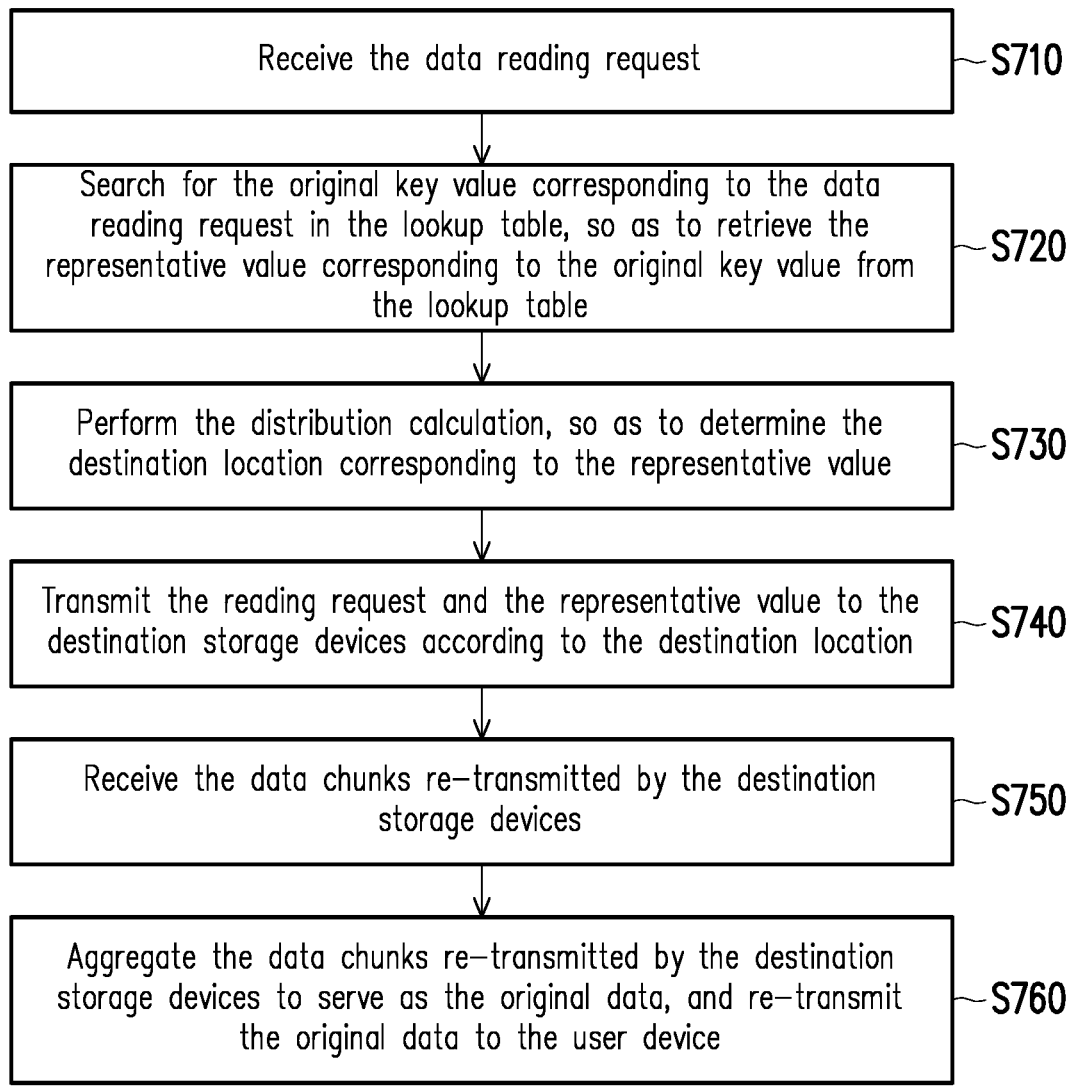
FIG. 7 is a schematic diagram illustrating a reading operation flow of the main dispatch device shown in FIG. 5 according to an embodiment of the disclosure.

FIG. 7 is a schematic diagram illustrating the reading operation flow of the main dispatch device 111 shown in FIG. 5 according to an embodiment of the disclosure. The function of the backup dispatch device 112 shown in FIG. 5 may be deduced by analogy with reference to the relevant description of the main dispatch device 111. With reference to FIGS. 5 and 7, in Step S710, the main dispatch device 111 may receive a data reading request from the user device 10. The data reading request may include the original key value OID. In Step S720, the main dispatch device 111 may search for the original key value OID corresponding to the data reading request in the lookup table of the main dispatch device 111, so as to retrieve the representative value corresponding to the original key value OID from the lookup table. In Step S730, the main dispatch device 111 may perform a distribution calculation on the representative value, so as to determine the destination location corresponding to the representative value. In Step S740, the main dispatch device 111 may transmit the reading request and the representative value to the one (or more) destination storage devices among the storage devices 120_1 to 120_n through the communication network 20 according to the destination location.

For example, the main dispatch device 111 may search for the original key value OID in the lookup table of the main dispatch device 111, so as to retrieve the representative values HIDa and HIDb corresponding to the original key value OID from the lookup table. The main dispatch device 111 may perform a CRUSH calculation on the representative value HIDa, and transmit the reading request and the representative value HIDa to the storage device 120_1 (destination storage device) according to the calculated result (hypothesis). The main dispatch device 111 may transmit the reading request and the representative value HIDa to the storage device 120_2 (destination storage device) when the storage device 120_2 serves as a backup device of the storage device 120_1 and the data in the storage device 120_1 is invalid. Similarly, the main dispatch device 111 may perform the CRUSH calculation on the representative value HIDb, and transmit the reading request and the representative value HIDb to the storage device 120_4 (destination storage device) according to the calculated result (hypothesis). The main dispatch device 111 may transmit the reading request and the representative value HIDb to the storage device 120_5 (destination storage device) when the storage device 120_5 serves as a backup device of the storage device 120_4 and the data in the storage device 120_4 is invalid.

The destination storage device may read the corresponding data chunk in its local storage space according to the representative value provided by the main dispatch device 111, and then re-transmit the data chunk to the main dispatch device 111 according to the reading request. The main dispatch device 111 may aggregate the re-transmitted data chunks to serve as the original data D, and re-transmit the original data D to the user device 10 (Step S760) after the data chunks re-transmitted by the destination storage devices are received by the main dispatch device 111 (Step S750). For example, the storage device 120_1 (destination storage device) may read the corresponding data chunk ChunkA in its local storage space according to the representative value HIDa provided by the main dispatch device 111, and then re-transmit the data chunk ChunkA to the main dispatch device 111 according to the reading request. Similarly, the storage device 120_4 (destination storage device) may read the corresponding data chunk ChunkB in its local storage space according to the representative value HIDb provided by the main dispatch device 111, and then re-transmit the data chunk ChunkB to the main dispatch device 111 according to the reading request. The main dispatch device 111 may aggregate the data chunks ChunkA and ChunkB to serve as the original data D, and re-transmit the original key value OID and the original data D to the user device 10 after the data chunks ChunkA and ChunkB re-transmitted by the destination storage devices 120_1 and 120_4 are received by the main dispatch device 111.

Figure 8:
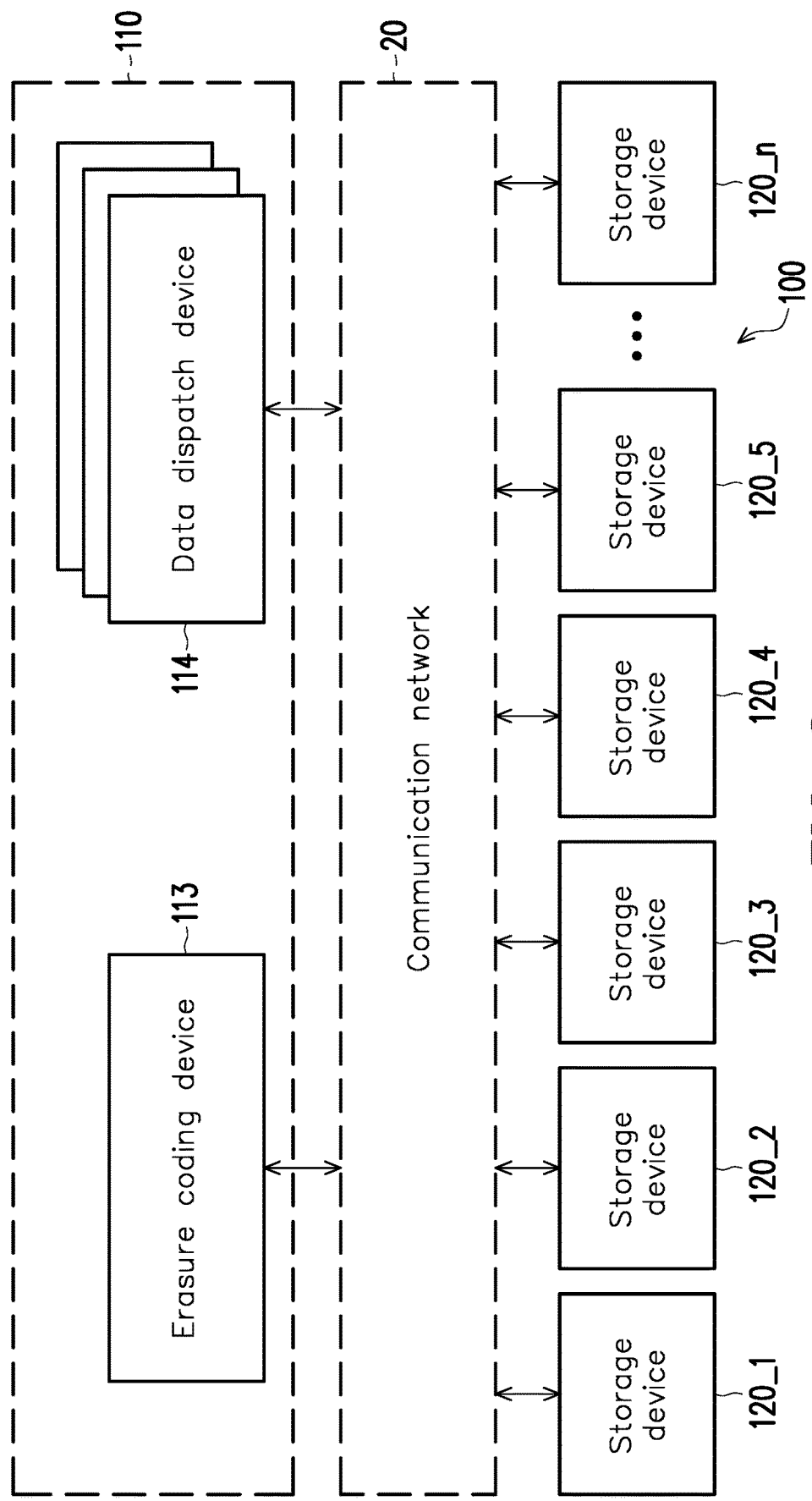
FIG. 8 is a schematic diagram illustrating a circuit block of the dispatch device shown in FIG. 1 or 2 according to another embodiment of the disclosure.

FIG. 8 is a schematic diagram illustrating a circuit block of the dispatch device 110 shown in FIG. 1 or 2 according to another embodiment of the disclosure. Reference may be made to the relevant descriptions of FIG. 3 and/or FIG. 4 for the embodiment described in FIG. 8, according to the design requirements. In the embodiment shown in FIG. 8, the dispatch device 110 includes an erasure coding device 113 and one (or more) data dispatch devices 114. The erasure coding device 113 and the data dispatch device 114 are suitable for coupling to the communication network 20. The erasure coding device 113 and the data dispatch device 114 are two independent electronic apparatuses. Either the erasure coding device 113 or the data dispatch device 114 may be a personal computer, a workstation, a server, a NAS device, and/or other electronic apparatuses, according to the design requirements. In some embodiments, the erasure coding device 113 (or the data dispatch device 114) may be another electronic apparatus independent of the storage devices 120_1 to 120_n, according to the design requirements. In other embodiments, at least one of the storage devices 120_1 to 120_n may be selected to serve as the erasure coding device 113 (or the data dispatch device 114).

Blocks of the erasure coding device 113 and/or the data dispatch device 114 may be implemented as hardware, firmware, software (that is, a program), or a combination of at least two of the three, according to the different design requirements. In terms of software and/or firmware, relevant functions of the erasure coding device 113 and/or the data dispatch device 114 may be implemented as a programming code. For example, a general programming language (such as C, C++, or other assembly languages) or other suitable programming language is used to implement the erasure coding device 113 and/or the data dispatch device 114. The programming code may be recorded/stored in a recording medium. A computer, a CPU, a controller, a microcontroller, or a microprocessor may read and execute the programming code from the recording medium, thereby implementing the relevant functions of the erasure coding device 113 and/or the data dispatch device 114. Moreover, the programming code may also be provided to the computer (or the CPU) via any transmission medium (such as a communication network or broadcasting waves).

Figure 9:
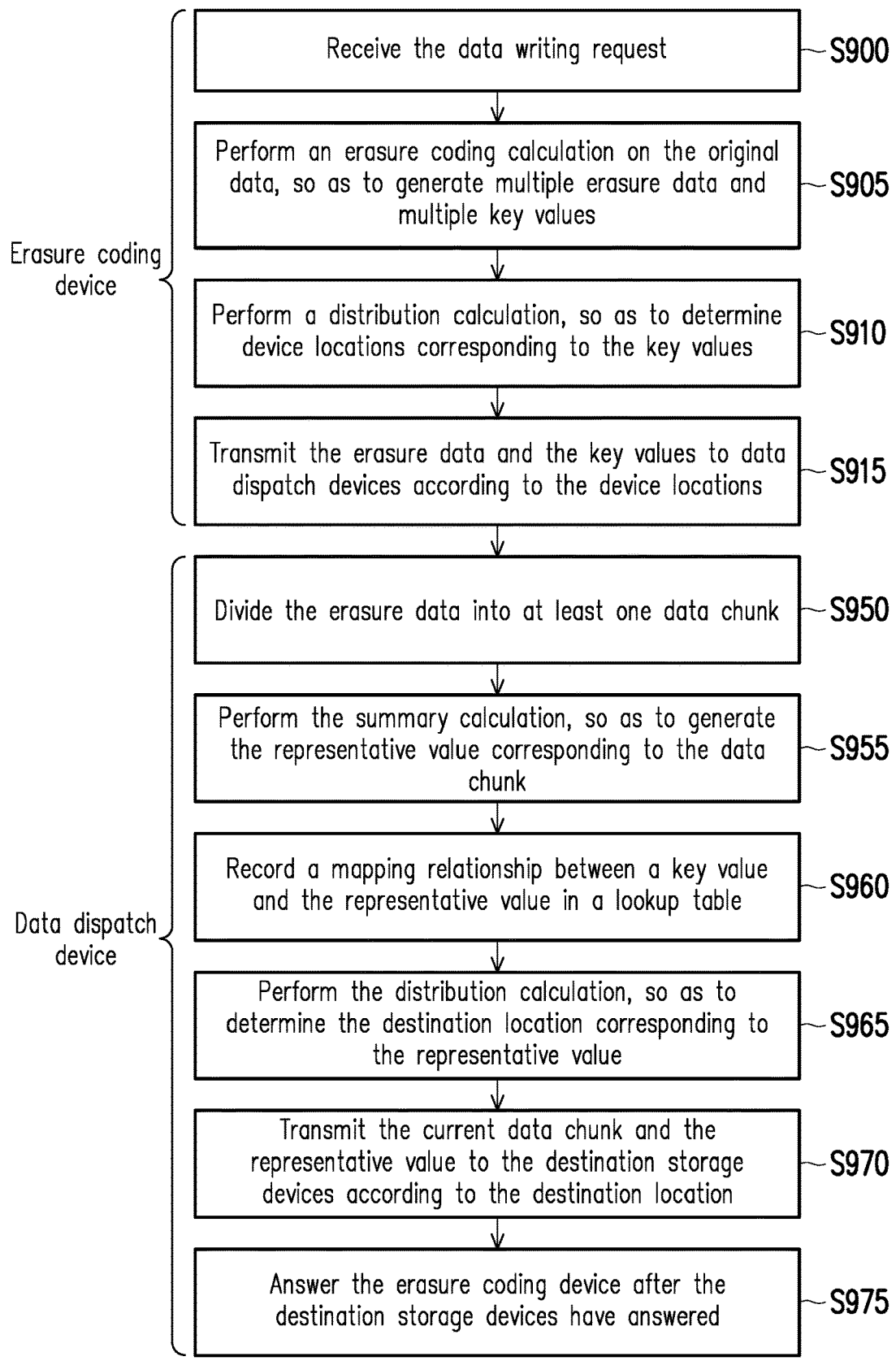
FIG. 9 is a schematic diagram illustrating a writing operation flow of the erasure coding device and the data dispatch device shown in FIG. 8 according to an embodiment of the disclosure.

FIG. 9 is a schematic diagram illustrating a writing operation flow of the erasure coding device 113 and the data dispatch device 114 shown in FIG. 8 according to an embodiment of the disclosure. The function of the data dispatch device 114 shown in FIG. 8 may be deduced by analogy with reference to the relevant description of the erasure coding device 113. With reference to FIGS. 8 and 9, in Step S900, the erasure coding device 113 may receive a data writing request from the user device 10. The data writing request may include the original key value OID and the original data D.

In Step S905, the erasure coding device 113 may perform an erasure coding calculation on the original data D, so as to generate multiple erasure data and multiple key values corresponding to the erasure data. In Step S910, the erasure coding device 113 may perform a distribution calculation on each of the key values, so as to generate multiple device locations corresponding to the key values. In Step S915, the erasure coding device 113 may transmit the erasure data and the key values to the multiple data dispatch devices 114 through the communication network 20 according to the device locations. For example, the erasure coding device 113 may perform an erasure coding calculation on the original data D, so as to generate multiple erasure data Shard1, Shard2, Shard3, Shard4, and Shard5. The erasure coding device 113 may also generate key values OID1, OID2, OID3, OID4, and OID5 corresponding to the erasure data Shard1 to Shard5 according to the original key value OID. The erasure coding device 113 may perform a distribution calculation on the key value OID1, so as to transmit the erasure data Shard1 and the key value OID1 to a first data dispatch device among the data dispatch devices 114 through the communication network 20. Similarly, the erasure coding device 113 may transmit the erasure data Shard2 and the key value OID2 to a second data dispatch device among the data dispatch devices 114 through the communication network 20, transmit the erasure data Shard3 and the key value OID3 to a third data dispatch device among the data dispatch devices 114, transmit the erasure data Shard4 and the key value OID4 to a fourth data dispatch device among the data dispatch devices 114, and transmit the erasure data Shard5 and the key value OID5 to a fifth data dispatch device among the data dispatch devices 114.

In Step S950, the data dispatch devices 114 may divide the erasure data into one (or more) data chunks. In Step S955, the data dispatch devices 114 may perform a summary calculation on a current data chunk in the data chunks, so as to generate a representative value corresponding to the current data chunk. In Step S960, the data dispatch device 114 may record a mapping relationship between the original key value and the representative value in a lookup table of the data dispatch device 114. For example, the first data dispatch device among the data dispatch devices 114 may divide the erasure data Shard1 into a data chunk Chunk1A (or more data chunks), and the first data dispatch device may perform a hash calculation on the data chunk Chunk1A, so as to generate a representative value HID1a, and the first data dispatch device may record the mapping relationship between the key value OID1 and the representative value HID1 a in a lookup table of the first data dispatch device. Similarly, operations of the second to the fifth data dispatch devices among the data dispatch devices 114 may be deduced by analogy with reference to the relevant description of the first data dispatch device among the data dispatch devices 114, which will not be repeated here.

In Step S965, the data dispatch devices 114 may perform a distribution calculation on the representative value, so as to determine a destination location corresponding to the representative value. In Step S970, the data dispatch device 114 may transmit the current data chunk and the representative value to one (or more) destination storage device among the storage devices 120_1 to 120_n through the communication network 20 according to the destination location. For example, the first data dispatch device among the data dispatch devices 114 may perform a CRUSH calculation on the representative value HID1 a of the data chunk Chunk1A, and transmit the representative value HID1a and the data chunk Chunk1A to the storage device 120_1 (destination storage device) according to the calculated result (hypothesis).

The data dispatch devices 114 may answer the erasure coding device 113 (Step S975) after the destination storage devices have answered (indicating successful storage). The erasure coding device 113 may answer (indicating successful storage) the user device 10 after the data dispatch devices 114 have answered (indicating successful storage).

Figure 10:
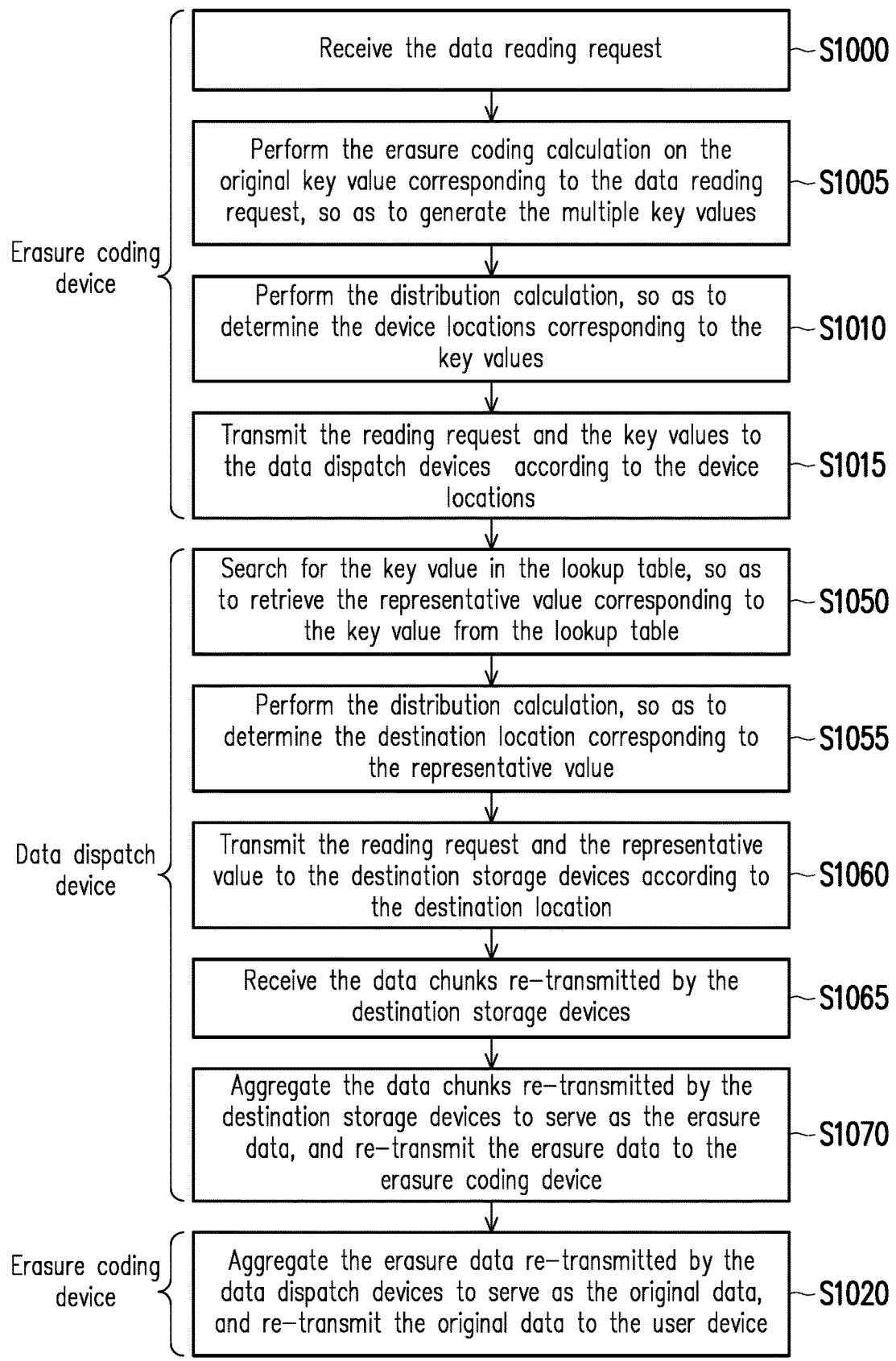
FIG. 10 is a schematic diagram illustrating a reading operation flow of the erasure coding device and the data dispatch device shown in FIG. 8 according to an embodiment of the disclosure.

FIG. 10 is a schematic diagram illustrating a reading operation flow of the erasure coding device 113 and the data dispatch device 114 shown in FIG. 8 according to an embodiment of the disclosure. With reference to FIGS. 8 and 10, in Step S1000, the erasure coding device 113 may receive a data reading request from the user device 10. The data reading request may include the original key value OID. In Step S1005, the erasure coding device 113 may perform the erasure coding calculation on the original key value OID, so as to generate the multiple key values. In Step S1010, the erasure coding device 113 may perform the distribution calculation on each of the key values, so as to generate the multiple device locations corresponding to the key values. In Step S1015, the erasure coding device 113 may transmit the reading request and the key values to the multiple data dispatch devices 114 via the communication network 20 according to the device locations.

For example, the erasure coding device 113 may perform the erasure coding calculation on the original key value OID, so as to generate the multiple key values OID1, OID2, OID3, OID4, and OID5. The erasure coding device 113 may perform the distribution calculation on the key value OID1, so as to transmit the reading request and the key value OID to the first data dispatch device among the data dispatch devices 114 through the communication network 20. Similarly, the erasure coding device 113 may transmit the reading request and the key value OID2 to the second data dispatch device among the data dispatch devices 114 through the communication network 20, transmit the reading request and the key value OID3 to the third data dispatch device among the data dispatch devices 114, transmit the reading request and the key value OID4 to the fourth data dispatch device among the data dispatch devices 114, and transmit the reading request and the key value OID5 to the fifth data dispatch device among the data dispatch devices 114.

In Step S1050, the data dispatch device 114 may search for the key value corresponding to the reading request in the lookup table of the data dispatch device 114, so as to retrieve the representative value corresponding to the key value from the lookup table. In Step S1055, the data dispatch device 114 may perform a distribution calculation on the representative value, so as to determine a destination location corresponding to the representative value. In Step S1060, the data dispatch device 114 may transmit the reading request and the representative value to one (or more) destination storage device among the storage devices 120_1 to 120_n through the communication network 20 according to the destination location.

For example, the first data dispatch device among the data dispatch devices 114 may search for the key value OID1 in the lookup table of the first data dispatch device, so as to retrieve the representative value HID1a corresponding to the key value OID1 from the lookup table. The first data dispatch device may perform a CRUSH calculation on the representative value HID1a, and transmit the reading request and the representative value HID1a to the storage device 120_1 (destination storage device) according to the calculated result (hypothesis). Similarly, the operations of the second to the fifth data dispatch devices among the data dispatch devices 114 may be deduced by analogy with reference to the relevant description of the first data dispatch device among the data dispatch devices 114, which will not be repeated here.

The destination storage devices may read corresponding data chunks in their local storage space according to the representative values provided by the data dispatch devices 114, and then re-transmit the data chunks to the data dispatch devices 114 according to the reading request. The data dispatch devices 114 may aggregate the re-transmitted data chunks to serve as the erasure data, and re-transmit the erasure data to the erasure coding device 113 (Step S1070)

after the data chunks re-transmitted by the destination storage devices are received by the data dispatch devices 114 (Step S1065). The erasure coding device 113 may aggregate the re-transmitted erasure data to serve as the original data D, and re-transmit the original key value OD and the original data D to the user device 10 (Step S1020) after the erasure data re-transmitted by the data dispatch devices 114 is received by the erasure coding device 113.

For example, the storage device 120_1 (destination storage device) may read the corresponding data chunk Chunk1A in its local storage space according to the representative value HID1a provided by the first data dispatch device among the data dispatch devices 114, and then re-transmit the data chunk Chunk1A to the first data dispatch device according to the reading request. The first data dispatch device may aggregate the data chunk ChunkA to serve as the erasure data Shard1, and re-transmit the key value OID1 and the erasure data Shard1 to the erasure coding device 113 after the data chunk Chunk1A re-transmitted by the destination storage device 120_1 is received by the first data dispatch device. Similarly, the operations of the second to the fifth data dispatch devices among the data dispatch devices 114 may be deduced by analogy with reference to the relevant description of the first data dispatch device among the data dispatch devices 114, which will not be repeated here. The erasure coding device 113 may aggregate the erasure data Shard1 to Shard5 to serve as the original data D, and re-transmit the original key value OID and the original data D to the user device 10 after the erasure data Shard1 to Shard5 re-transmitted by the data dispatch devices 114 are received by the erasure coding device 113.

Figure 11:
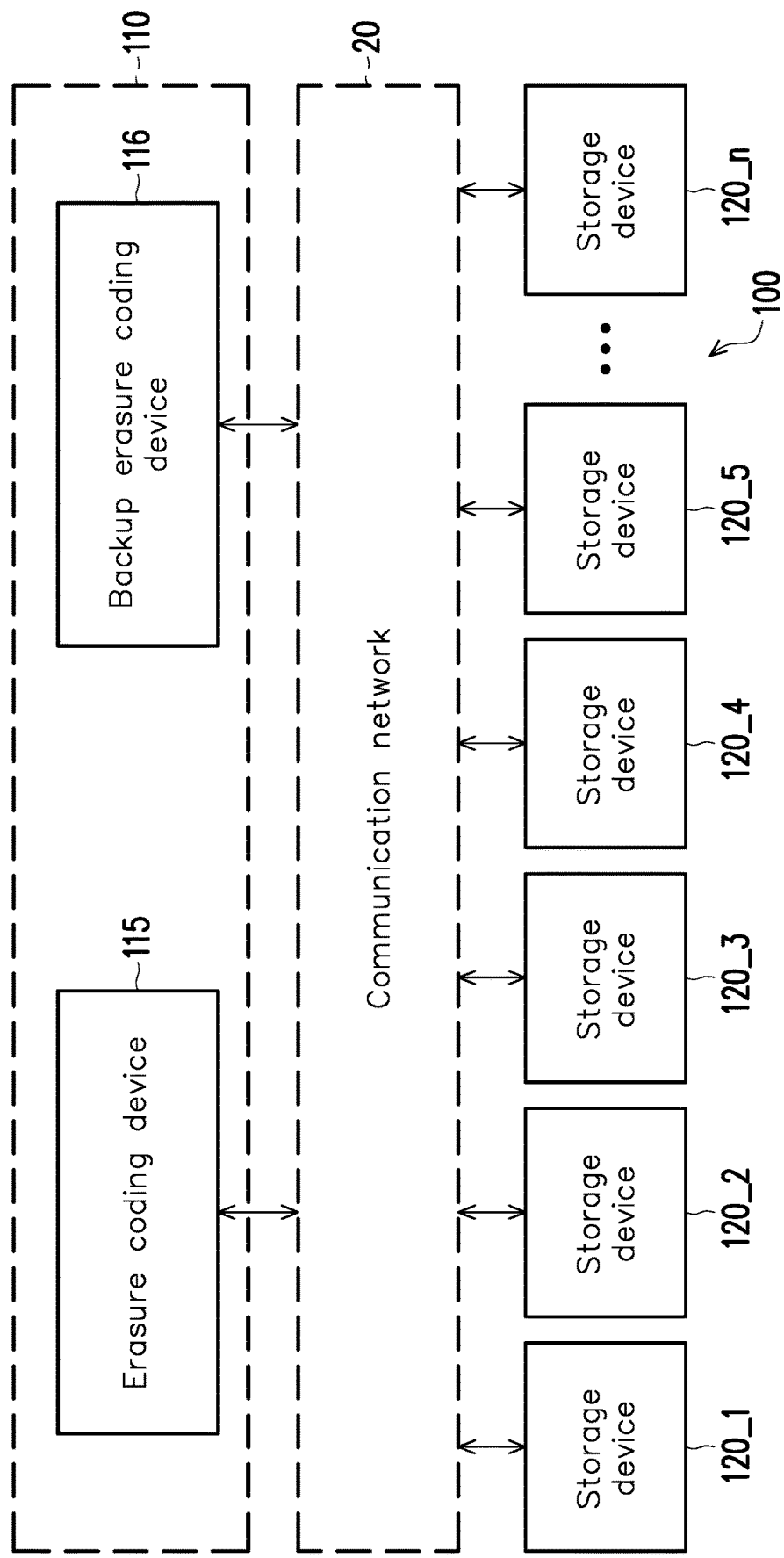
FIG. 11 is a schematic diagram illustrating a circuit block of the dispatch device shown in FIG. 1 or 2 according to yet another embodiment of the disclosure.

FIG. 11 is a schematic diagram illustrating a circuit block of the dispatch device 110 shown in FIG. 1 or 2 according to yet another embodiment of the disclosure. Reference may be made to the relevant descriptions of FIG. 3 and (or) FIG. 4 for the embodiment described in FIG. 11, according to the design requirements. In the embodiment shown in FIG. 11, the dispatch device 110 includes an erasure coding device 115 and a backup erasure coding device 116. The erasure coding device 115 and the backup erasure coding device 116 are suitable for coupling to the communication network 20. The erasure coding device 115 and the backup erasure coding device 116 are two independent electronic apparatuses. Either the erasure coding device 115 or the backup erasure coding device 116 may be a personal computer, a workstation, a server, a NAS device, and/or other electronic apparatuses, according to the design requirements. In some embodiments, the erasure coding device 115 (or the backup erasure coding device 116) may be another electronic apparatus independent of the storage devices 120_1 to 120_n, according to the design requirements. In other embodiments, at least one of the storage devices 120_1 to 120_n may be selected to serve as the erasure coding device 115 (or the backup erasure coding device 116).

Blocks of the erasure coding device 115 and/or the backup erasure coding device 116 blocks may be implemented as hardware, firmware, software (that is, a program), or a combination of at least two of the three, according to the design requirements. In terms of software and/or firmware, relevant functions of the erasure coding device 115 and/or the backup erasure coding device 116 may be implemented as a programming code. For example, a general programming language (such as C, C++, or other assembly languages) or other suitable programming language is used to implement the erasure coding device 115 and/or the backup erasure coding device 116. The programming code may be recorded/stored in a recording medium. A computer, a CPU, a controller, a microcontroller, or a microprocessor may read and execute the programming code from the recording medium, thereby implementing the relevant functions of the erasure coding device 115 and/or the backup erasure coding device 116. Moreover, the programming code may also be provided to the computer (or the CPU) via any transmission medium (such as a communication network or broadcasting waves).

Figure 12:
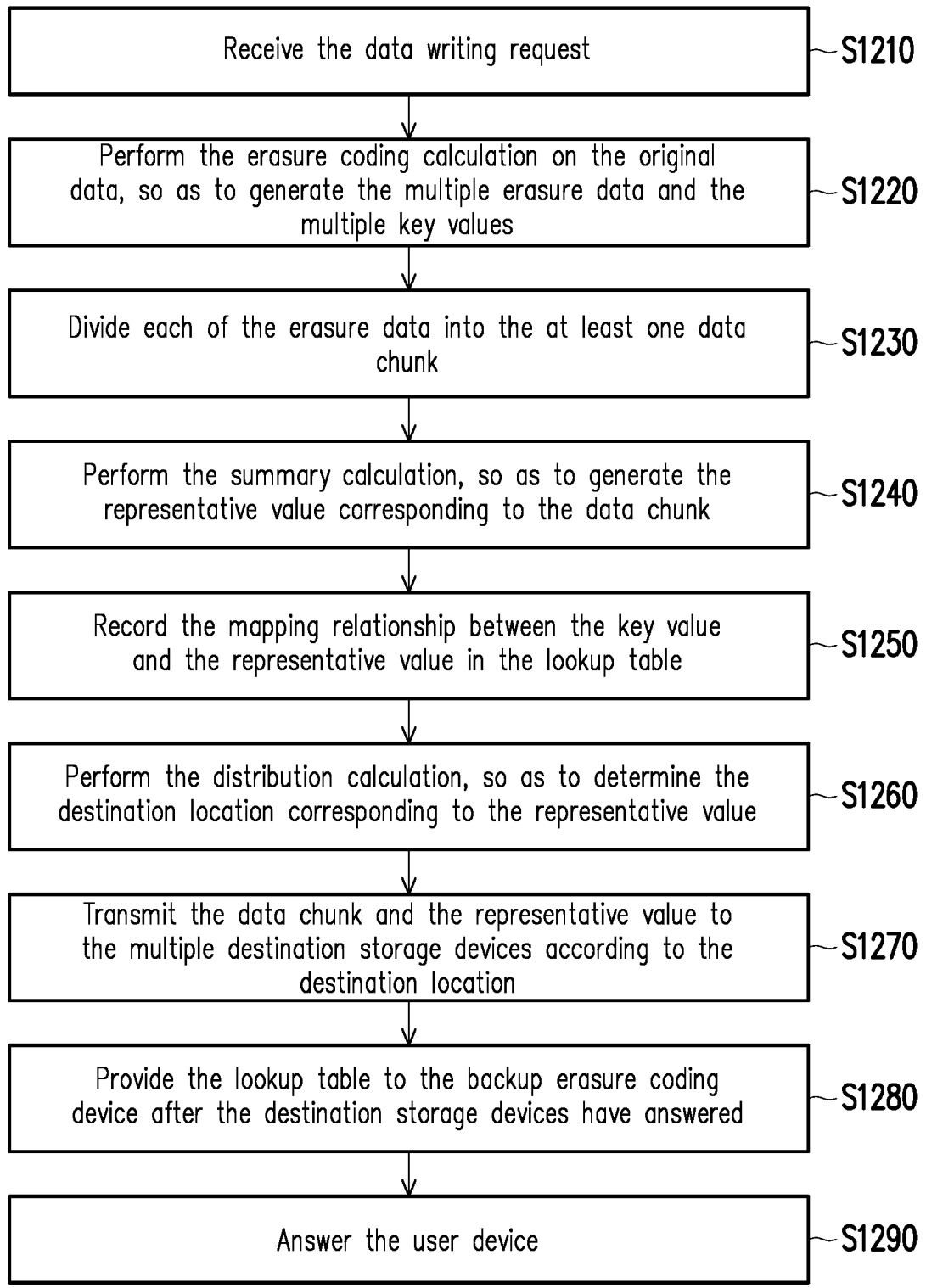
FIG. 12 is a schematic diagram illustrating a writing operation flow of the erasure coding device shown in FIG. 11 according to an embodiment of the disclosure.

FIG. 12 is a schematic diagram illustrating a writing operation flow of the erasure coding device 115 shown in FIG. 11 according to an embodiment of the disclosure. The function of the backup erasure coding device 116 shown in FIG. 11 may be deduced by analogy with reference to the relevant description of the erasure coding device 115. With reference to FIGS. 11 and 12, in Step S1210, the erasure coding device 115 may receive a data writing request from the user device 10. The data writing request may include the original key value OID and the original data D.

In Step S1220, the erasure coding device 115 may perform an erasure coding calculation on the original data D, so as to generate the multiple erasure data and the multiple key values corresponding to the erasure data. For example, the erasure coding device 115 may perform the erasure coding calculation on the original data D, so as to generate the multiple erasure data Shard1, Shard2, Shard3, Shard4, and Shard5. The erasure coding device 115 may also generate the key values OID1, OID2, OID3, OID4, and OID5 corresponding to the erasure data Shard1 to Shard5 according to the original key value OID.

In Step S1230, the erasure coding device 115 may divide each of the erasure data into one (or more) data chunks. In Step S1240, the erasure coding device 115 may perform a summary calculation on a current data chunk in the data chunks, so as to generate a representative value corresponding to the current data chunk. In Step S1250, the erasure coding device 115 may record a mapping relationship between the key value and the representative value in a lookup table of the erasure coding device 115. For example, the erasure coding device 115 may divide the erasure data Shard1 into the data chunk Chunk1A (or more data chunks). Similarly, the erasure coding device 115 may divide the erasure data Shard2 into the data chunk Chunk2A, the erasure data Shard3 into the data chunk Chunk3A, the erasure data Shard4 into the data chunk Chunk4A, and the erasure data Shard5 into the data chunk Chunk5A. The erasure coding device 115 may perform a hash calculation on the data chunk Chunk1A, so as to generate the representative value HID1a, perform the hash calculation on the data chunk Chunk2A, so as to generate the representative value HID2a, perform the hash calculation on the data chunk Chunk3A, so as to generate the representative value HID3a, perform the hash calculation on the data chunk Chunk4A, so as to generate the representative value HID4a, and perform the hash calculation on the data chunk Chunk5A, so as to generate the representative value HID5a. The erasure coding device 115 may record the mapping relationship between the key values OID1 to OID5 and the representative values HID1a to HID5a in the lookup table of the erasure coding device 115.

In Step S1260, the erasure coding device 115 may perform a distribution calculation on the representative value, so as to determine a destination location corresponding to the representative value. In Step S1270, the erasure coding device 115 may transmit the current data chunk and the representative value to a destination storage device among the storage devices 120_1 to 120_n through the communication network 20 according to the destination location. For example, the erasure coding device 115 may perform a CRUSH calculation on the representative value HID1a of the data chunk Chunk1A, and transmit the representative value HID1a and the data chunk Chunk1A to the storage device 120_1 (destination storage device) according to the calculated result (hypothesis). Similarly, the erasure coding device 115 may perform the CRUSH calculation on the representative values HID2a to HID5a of the data chunks Chunk2A to Chunk5A, and respectively transmit the representative values HID2a to HID5a and the data chunks Chunk2A to Chunk5A to the storage devices 120_2 to 120_5 (destination storage devices) according to the calculated results (hypothesis).

The erasure coding device 115 may provide the lookup table to the backup erasure coding device 116 (Step S1280) after the destination storage devices have answered (indicating successful storage). In Step S1290, the erasure coding device 115 may answer the user device 10, so as to indicate successful storage. The content of the lookup table of the backup erasure coding device 116 is consistent with the content of the lookup table of the erasure coding device 115. Therefore, the backup erasure coding device 116 may replace the erasure coding device 115 to perform the writing operation flow shown in FIG. 12 and/or a reading operation flow shown in FIG. 13 when the lookup table of the erasure coding device 115 is damaged, or when the erasure coding device 115 is unable to operate normally.

Figure 13:
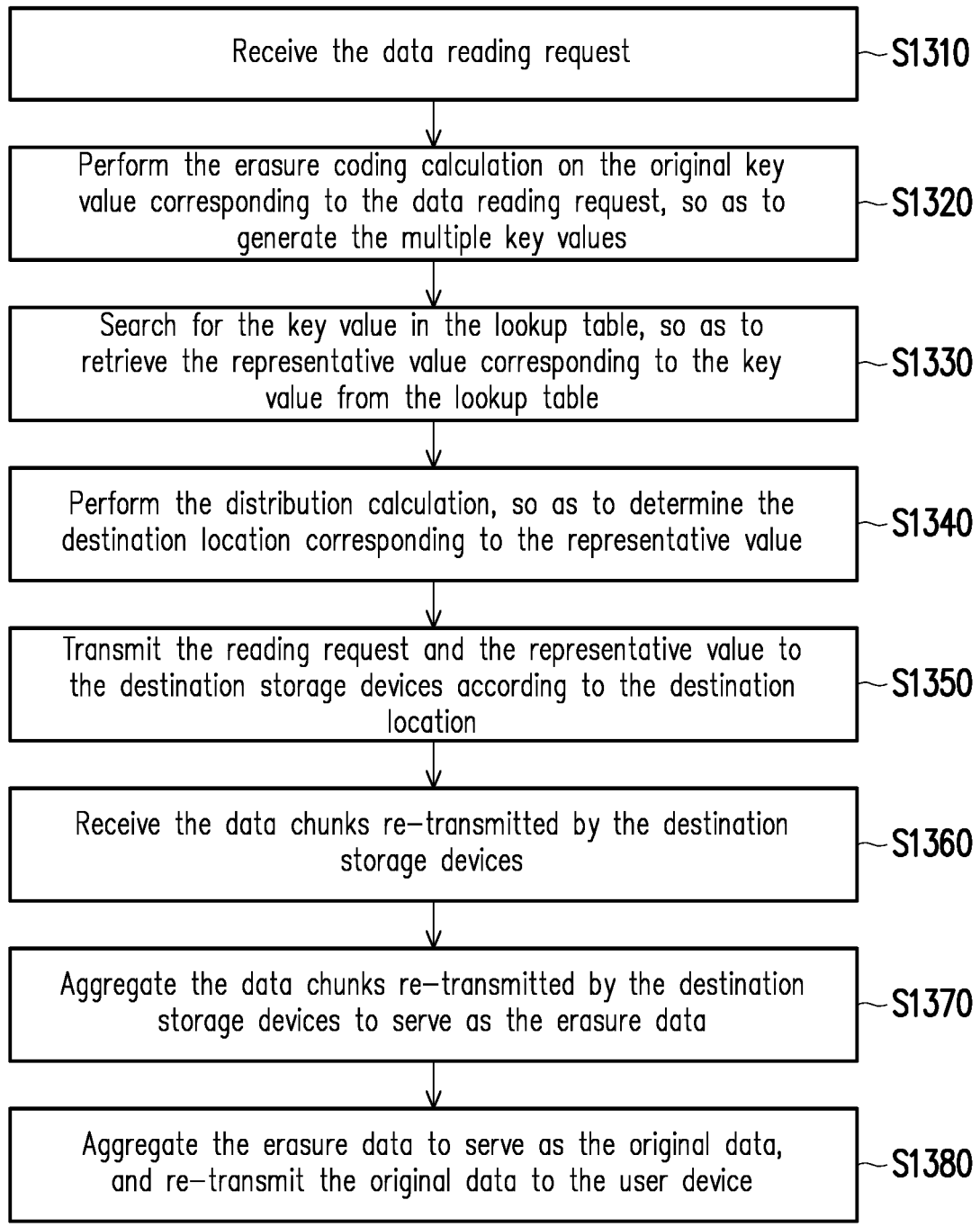
FIG. 13 is a schematic diagram illustrating a reading operation flow of the erasure coding device shown in FIG. 11 according to an embodiment of the disclosure.

FIG. 13 is a schematic diagram illustrating the reading operation flow of the erasure coding device 115 shown in FIG. 11 according to an embodiment of the disclosure. The function of the backup erasure coding device 116 shown in FIG. 11 may be deduced by analogy with reference to the relevant description of the erasure coding device 115. With reference to FIGS. 11 and 13, in Step S1310, the erasure coding device 115 may receive a data reading request from the user device 10. The data reading request may include the original key value OID. In Step S1320, the erasure coding device 115 may perform the erasure coding calculation on the original key value OID corresponding to the data reading request, so as to generate the multiple key values. In Step S1330, the erasure coding device 115 may search for the key values in the lookup table of the erasure coding device 115, so as to retrieve the representative values corresponding to the key values from the lookup table. In Step S1340, the erasure coding device 115 may perform the distribution calculation on the representative values, so as to determine the destination locations corresponding to the representative values. In Step S1350, the erasure coding device 115 may transmit the reading request and the representative values to the one (or more) destination storage devices among the storage devices 120_1 to 120_n through the communication network 20 according to the destination locations.

For example, the erasure coding device 115 may perform the erasure coding calculation on the original key value OID, so as to generate the multiple key values OID1, OID2, OID3, OID4, and OID5. The erasure coding device 115 may search for the key value OID1 in the lookup table of the erasure coding device 115, so as to retrieve the representative value HID1a corresponding to the key value OID1 from the lookup table. Similarly, the erasure coding device 115 may search for the key values OID2 to OID5 in the lookup table, so as to retrieve the representative values HID2a to HID5a corresponding to the key values OID2 to OID5 from the lookup table. The erasure coding device 115 may perform the CRUSH calculation on the representative values HID1a to HID5a, and respectively transmit the reading request and the representative values HID1a to HID5a to the storage devices 120_1 to 120_5 (destination storage devices) according to the calculated result (hypothesis).

The destination storage device may read the corresponding data chunk in its local storage space according to the representative value provided by the erasure coding device 115, and then re-transmit the data chunk to the erasure coding device 115 according to the reading request. The erasure coding device 115 may aggregate the re-transmitted data chunks to serve as the erasure data (Step S1370) after the data chunks re-transmitted by the destination storage devices are received by the erasure coding device 115 (Step S1360). The erasure coding device 115 may aggregate the erasure data to serve as the original data D, and re-transmit the original key value OID and the original data D to the user device 10 (Step S1380).

For example, the storage devices 120_1 to 120_5 (destination storage devices) may read the corresponding data chunks Chunk1A to Chunk5A in their local storage space according to the representative values HID1a to HID5a provided by the erasure coding device 115, and then re-transmit the data chunks Chunk1A to Chunk5A to the erasure coding device 115 according to the reading request. The erasure coding device 115 may aggregate the data chunks Chunk1A to Chunk5A to serve as the erasure data Shard1 to Shard5 after the data chunks Chunk1A to Chunk5A re-transmitted by the destination storage devices 120_1 to 120_5 are received by the erasure coding device 115. The erasure coding device 115 may aggregate the erasure data Shard1 to Shard5 to serve as the original data D, and re-transmit the original key value OID and the original data D to the user device 10.

In summary, the data storage system and the global deduplication method thereof according to the above embodiments may be applied to a distributed storage system. The dispatch device 110 may generate the representative value HID corresponding to the current data chunk, and determine the destination location according to the representative value HID. The dispatch device 110 may transmit the current data chunk and the representative value HID to the at least one destination storage device among the multiple storage devices through the communication network 20 according to the destination location. In other words, the same data chunk is transferred to the same storage device. The destination storage device may check the representative value HID, so as to determine whether to store the current data chunk in its local storage space. Therefore, the data storage system can effectively deduplicate in the distributed storage environment.

Although the disclosure has been described with reference to the above-mentioned embodiments, it is not intended to be exhaustive or to limit the disclosure to the precise form or to exemplary embodiments disclosed. It is apparent to one of ordinary skill in the art that modifications to the described embodiments may be made without departing from the spirit and the scope of the disclosure. Accordingly, the scope of the disclosure is defined by the claims appended hereto and their equivalents in which all terms are meant in their broadest reasonable sense unless otherwise indicated.

What is claimed is:

1. A data storage system, comprising:
 a plurality of storage devices, suitable for coupling to a communication network; and
 a dispatch device, suitable for receiving a data writing request, wherein the dispatch device is configured to divide an original data corresponding to the data writing request into at least one data chunk, the dispatch device performs a summary calculation on a current data chunk in the at least one data chunk, so as to generate a representative value corresponding to the current data chunk, the dispatch device performs a first distribution calculation on the representative value, so as to determine a destination location corresponding to the representative value, and the dispatch device transmits the current data chunk and the representative value to at least one destination storage device among the storage devices through the communication network according to the destination location, wherein the dispatch device comprises an erasure coding device and at least one data dispatch device, and the erasure coding device is configured to generate at least one erasure data and generate at least one key value corresponding to the at least one erasure data by performing an erasure coding calculation on the original data, wherein the erasure coding device receives the data writing request and performs a second distribution calculation on the at least one key value, so as to generate at least one device location corresponding to the at least one key value, wherein the erasure coding device transmits the at least one erasure data and the at least one key value to the at least one data dispatch device through the communication network according to the at least one device location, wherein the at least one data dispatch device divides the at least one erasure data into the at least one data chunk, the at least one data dispatch device performs the summary calculation on the current data chunk in the at least one data chunk, so as to generate the representative value, wherein the at least one data dispatch device performs the first distribution calculation on the representative value, so as to determine the destination location, and the at least one data dispatch device transmits the current data chunk and the representative value to the at least one destination storage device through the communication network according to the destination location, wherein the at least one destination storage device checks the representative value, so as to determine whether to store the current data chunk in a storage space of the at least one destination storage device.

2. The data storage system according to claim 1, wherein at least one of the storage devices is selected to serve as the dispatch device.

3. The data storage system according to claim 1, wherein the summary calculation comprises a hash algorithm, and the representative value comprises a hash value of the current data chunk.

4. The data storage system according to claim 1, wherein the first distribution calculation comprises a Ceph CRUSH algorithm.

5. The data storage system according to claim 1, wherein the at least one destination storage device checks whether the representative value exists in a lookup table, the at least one destination storage device abandons storing the current data chunk in the storage space, adjusts and increases a reference number value corresponding to the representative value, and updates the reference number value to the lookup table when the lookup table has the representative value; and the at least one destination storage device stores the current data chunk in a physical address of the storage space, sets the reference number value corresponding to the representative value to an initial value, and records the representative value, the physical address, and the reference number value in the lookup table when the lookup table does not have the representative value.

6. The data storage system according to claim 1, wherein the dispatch device comprises a main dispatch device and a backup dispatch device, the data writing request further comprises an original key value, and the main dispatch device records a mapping relationship between the original key value and the representative value in a lookup table, and provides the lookup table to the backup dispatch device.

7. The data storage system according to claim 1, wherein the at least one destination storage device comprises a first destination storage device and a second destination storage device, and the dispatch device transmits the current data chunk and the representative value to the first destination storage device and the second destination storage device through the communication network.

8. The data storage system according to claim 1, wherein the at least one data dispatch device records a mapping relationship between the at least one key value and the representative value in a lookup table.

9. The data storage system according to claim 1, wherein the data writing request comprises an original key value, and the dispatch device records a mapping relationship between the original key value and the representative value in a lookup table.

10. A data storage system, comprising:

a plurality of storage devices, suitable for coupling to a communication network; and a dispatch device, suitable for receiving a data writing request, wherein the dispatch device is configured to divide an original data corresponding to the data writing request into at least one data chunk, the dispatch device performs a summary calculation on a current data chunk in the at least one data chunk, so as to generate a representative value corresponding to the current data chunk, the dispatch device performs a first distribution calculation on the representative value, so as to determine a destination location corresponding to the representative value, and the dispatch device transmits the current data chunk and the representative value to at least one destination storage device among the storage devices through the communication network according to the destination location, wherein the at least one destination storage device checks the representative value, so as to determine whether to store the current data chunk in a storage space of the at least one destination storage device, wherein the dispatch device comprises an erasure coding device, the erasure coding device receives the data writing request, the erasure coding device performs an erasure coding calculation on the original data, so as to generate at least one erasure data and at least one key value corresponding to the at least one erasure data, the erasure coding device divides the at least one erasure data into the at least one data chunk, the erasure coding device performs the summary calculation on the current data chunk in the at least one data chunk, so as to generate the representative value, the erasure coding device performs the first distribution calculation on the representative value, so as to determine the destination location, and the erasure coding device transmits the current data chunk and the representative value to the at least one destination storage device through the communication network according to the destination location.

11. The data storage system according to claim 10, wherein the erasure coding device records a mapping relationship between the at least one key value and the representative value in a lookup table.

12. The data storage system according to claim 11, wherein the dispatch device further comprises a backup erasure coding device, and the erasure coding device provides the lookup table to the backup erasure coding device.

13. A global deduplication method, comprising:
receiving a data writing request by a dispatch device;
dividing an original data corresponding to the data writing request into at least one data chunk by the dispatch device;
performing a summary calculation on a current data chunk in the at least one data chunk by the dispatch device, so as to generate a representative value corresponding to the current data chunk;
performing a first distribution calculation on the representative value by the dispatch device, so as to determine a destination location corresponding to the representative value;
transmitting the current data chunk and the representative value to at least one destination storage device among a plurality of storage devices by the dispatch device through a communication network according to the destination location; and
checking the representative value by the at least one destination storage device, so as to determine whether to store the current data chunk in a storage space of the at least one destination storage device,
wherein the dispatch device comprises an erasure coding device and at least one data dispatch device, the global deduplication method further comprising:
receiving the data writing request by the erasure coding device;
performing an erasure coding calculation on the original data by the erasure coding device to generate at least one erasure data and to generate at least one key value corresponding to the at least one erasure data;
performing a second distribution calculation on the at least one key value by the erasure coding device, so as to generate at least one device location corresponding to the at least one key value;
transmitting the at least one erasure data and the at least one key value to the at least one data dispatch device by the erasure coding device through the communication network according to the at least one device location;
dividing the at least one erasure data into the at least one data chunk by the at least one data dispatch device;
performing the summary calculation on the current data chunk in the at least one data chunk by the at least one data dispatch device, so as to generate the representative value;
performing the first distribution calculation on the representative value by the at least one data dispatch device, so as to determine the destination location; and
transmitting the current data chunk and the representative value to the at least one destination storage device by the at least one data dispatch device through the communication network according to the destination location.

14. The global deduplication method according to claim 13, wherein at least one of the storage devices is selected to serve as the dispatch device.

15. The global deduplication method according to claim 13, wherein the summary calculation comprises a hash algorithm, and the representative value comprises a hash value of the current data chunk.

16. The global deduplication method according to claim 13, wherein the first distribution calculation comprises a Ceph CRUSH algorithm.

17. The global deduplication method according to claim 13, further comprising:
checking whether the representative value exists in a lookup table by the at least one destination storage device;
abandoning storing the current data chunk in the storage space, adjusting and increasing a reference number value corresponding to the representative value, and updating the reference number value to the lookup table by the at least one destination storage device when the lookup table has the representative value; and
storing the current data chunk in a physical address of the storage space, setting the reference number value corresponding to the representative value to an initial value, and recording the representative value, the physical address, and the reference number value in the lookup table by the at least one destination storage device when the lookup table does not have the representative value.

18. The global deduplication method according to claim 13, wherein the dispatch device comprises a main dispatch device and a backup dispatch device, and the data writing request further comprises an original key value, the global deduplication method further comprising:
recording a mapping relationship between the original key value and the representative value in a lookup table by the main dispatch device; and
providing the lookup table to the backup dispatch device by the main dispatch device.

19. The global deduplication method according to claim 13, wherein the at least one destination storage device comprises a first destination storage device and a second destination storage device, the global deduplication method further comprising:
transmitting the current data chunk and the representative value to the first destination storage device and the second destination storage device by the dispatch device through the communication network.

20. The global deduplication method according to claim claim 13, further comprising:
recording a mapping relationship between the at least one key value and the representative value in a lookup table by the at least one data dispatch device.

21. The global deduplication method according to claim 13, wherein the data writing request comprises an original key value, the global deduplication method further comprising:
recording a mapping relationship between the original key value and the representative value in a lookup table by the dispatch device.

22. A global deduplication method, comprising:
receiving a data writing request by a dispatch device;
dividing an original data corresponding to the data writing request into at least one data chunk by the dispatch device;
performing a summary calculation on a current data chunk in the at least one data chunk by the dispatch device, so as to generate a representative value corresponding to the current data chunk;

performing a first distribution calculation on the representative value by the dispatch device, so as to determine a destination location corresponding to the representative value;

transmitting the current data chunk and the representative value to at least one destination storage device among a plurality of storage devices by the dispatch device through a communication network according to the destination location; and checking the representative value by the at least one destination storage device, so as to determine whether to store the current data chunk in a storage space of the at least one destination storage device, wherein the dispatch device comprises an erasure coding device, the global deduplication method further comprising:

receiving the data writing request by the erasure coding device;

performing an erasure coding calculation on the original data by the erasure coding device, so as to generate at least one erasure data and at least one key value corresponding to the at least one erasure data;

dividing the at least one erasure data into the at least one data chunk by the erasure coding device;

performing the summary calculation on the current data chunk in the at least one data chunk by the erasure coding device, so as to generate the representative value;

performing the first distribution calculation on the representative value by the erasure coding device, so as to determine the destination location; and transmitting the current data chunk and the representative value to the at least one destination storage device by the erasure coding device through the communication network according to the destination location.

23. The global deduplication method according to claim 22, further comprising:

recording a mapping relationship between the at least one key value and the representative value in a lookup table by the erasure coding device.

24. The global deduplication method according to claim 23, wherein the dispatch device further comprises a backup erasure coding device, the global deduplication method further comprising:

providing the lookup table to the backup erasure coding device by the erasure coding device.

* * * * *